June 25, 1957 E. F. EGER 2,796,710

LOADING FIXTURE

Filed July 21, 1954

INVENTOR
E. F. EGER
BY W. C. Parnell
ATTORNEY

United States Patent Office
2,796,710
Patented June 25, 1957

2,796,710

LOADING FIXTURE

Edward F. Eger, Indianapolis, Ind., assignor to Western Electric Company, Incorporated, New York, N. Y., a corporation of New York Application July 21, 1954, Serial No. 444,870
7 Claims. (Cl. 53—124)

This invention relates to a loading fixture and particularly to a fixture for loading and compressing or flattening out stacked resilient articles in a rack in which they are retained for subsequent processing.

In the mass production of metallized paper capacitors which, when finished, consist of wax impregnated rolls of metallized paper having solder terminals on each end, the rolls of metallized paper are held compressed in a flattened condition to decrease the size, increase the capacitance and place the ends in proper position for receiving the solder terminals.

It is a principal object of this invention to provide a device for loading and compressing large quantities of such articles in a rack to speed up the mass processing of such articles.

In accordance with the general features of the invention, rolled articles are stacked in layers separated by spacers in a rack held in the fixture, the layers being stacked beyond an open end of the rack to a predetermined height in a rack extension on the fixture. Compressing means on the fixture engage a spacer or bar placed on the top of the stack and press the layers down into the rack so that the open end thereof may be closed. The rack holding means on the fixture is released after loading and a rack ejector on the fixture actuated to remove the rack therefrom.

These and other features of the invention will be more fully understood from the following detailed description taken in conjunction with the accompanying drawing, in which.

Figures 1, 2, 3, 4, 5:
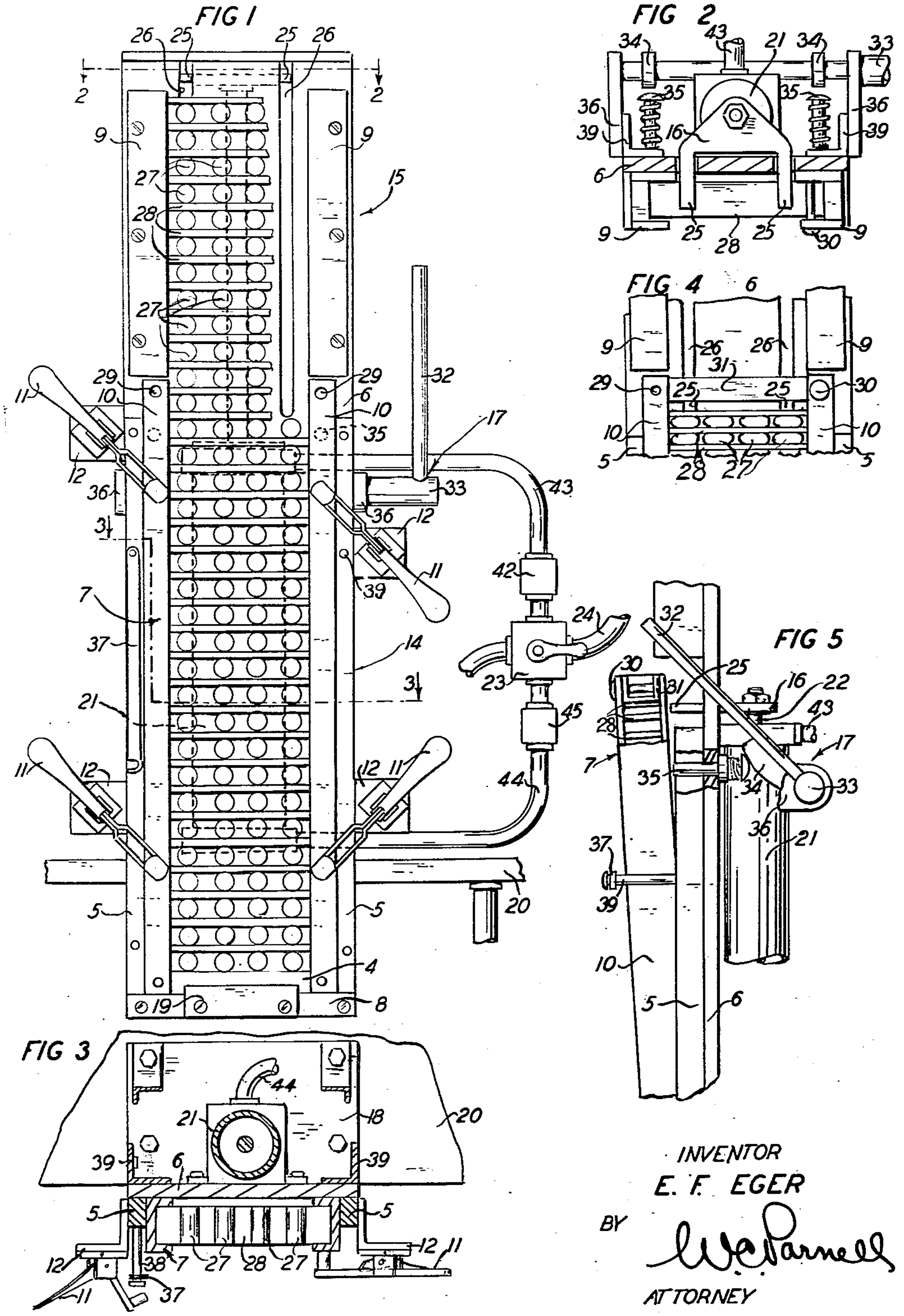
Fig. 1 is a front elevational view of the fixture according to the invention showing a capacitor loaded rack mounted therein.
Fig. 2 is a top view of the fixture as seen along the plane of line 2—2 of Fig. 1.
Fig. 3 is a cross-sectional view of Fig. 1 through the plane of line 3—3.
Fig. 4 is a partial view of the top of a rack mounted in the fixture showing the articles compressed therein.
Fig. 5 is a partial side view of the fixture showing the rack ejecting means.

Referring now to the drawing, the fixture consists primarily of a lower rack receiving portion 14, an upper rack extension portion 15, an air cylinder actuated compression member 16, a rack ejector 17, and a mounting plate 18 for attaching the fixture to a table or bench 20.

The lower rack receiving portion 14 comprises a U-shaped recessed portion including sides 5 for receiving side channel members 10 of a removable rack 7 also having a bottom bar 4 pinned thereto. The portion 14 includes bottom or end member 8 mounted on a main member or back plate 6 of the fixture. An extension member 19 on end member 8 holds the bottom of the U-shaped capacitor receiving rack 7 positioned in the recess and toggle clamps 11 or brackets 12 securely fasten the rack in place for loading (Fig. 3 shows a toggle clamp 11 in open position).

The upper rack extension portion 15 of the fixture in effect extends the size of the rack 7 for loading and comprises channeled side members 9 also mounted on the main plate 6 and extending upwardly from the channels 10. These side members are in alignment with the channeled sides 10 of the rack 7 positioned in the lower portion 14 of the fixture. In Fig. 1 the layers of capacitors 27 and spacers 28 are shown broken away to show one of the vertical slots 26 in the top part of the main plate 6.

An air cylinder 21 (shown in dashed lines in Fig. 1) is mounted to the back side of the main plate 6 and controls the bifurcated compression member 16 through rod 22. The air cylinder 21 is double acting, an air valve 23 being used to control the direction of operation thereof for raising or lowering member 16. In the "lower" or "compress" position of the valve 23, compressed air, from a source not shown, is applied to the top end of the air cylinder through a tube 24, the air valve 23, an air flow control valve 42 and tube 43 to drive the cylinder down, the bottom end of the cylinder being exhausted through tube 44, an air flow control valve 45, the valve 23 and an exhaust tube 41. When the valve 23 is in the "raise" position, the process is reversed, compressed air being applied to the bottom end of the cylinder 21 through the tube 24, the air valve 23, the air flow control valve 45, and tube 44 while the top end of the cylinder is exhausted through tube 43, air flow control valve 42, valve 23 and exhaust tube 41.

The two fingers 25 of the compression member 16 extend through slots 26 in the main plate 6 and, when actuated, are driven down the slots forcing along with them the stacked condensers 27 and spacers 28. As seen in Fig. 4 the layers are forced down below the holes 29 in the tops of the channeled sides 10 of the rack so that a top bar or channel 31 and pins 30 of the removable rack 7 may be inserted in the holes to effectively close the open end of the rack restraining the top spacer 28 therein.

To remove loaded racks from the fixture after pinning the bar 31 in place to hold the capacitors and spacers, clamps 11 are released and the ejector 17 is actuated to force the upper portion of the loaded rack from the fixture to free the rack of the fingers 25 of the compression member 16. The ejector comprises an actuating arm 32, mounted to the main plate 6 of the fixture by brackets 36 on angle irons 39, for rotating cam shaft 33. Cams 34 on shaft 33 actuate a spring mounted ejection pin 35 on each side of the main plate 6 directly behind the side channel members 10 of the rack. A retaining bar 37 pivotally mounted on extension member 38 (Fig. 3) on side member 5 is latched to pin 39 on the opposite side member 5 to support the loaded rack when the ejector 17 is actuated to free the rack from the fingers 25 and the fixture.

In use then, the rack 7, with the top bar 31 removed, is clamped into the recess in the lower portion 14 of the fixture, alternate layers of capacitors 27 and rigid spacers 28 are placed in the rack, the spacers being angled into the side members 10 of the rack or inserted in the opening above the rack extension portion 15. When the layers have been stacked to a predetermined height, which may be marked on the extension members 9 an end bar or spacer is placed thereon and the air valve 23 is actuated to energize the air cylinder 21 to drive the compression member 16 down. The bar 31 is placed over fingers 25 in the sides 10 and pins 30 are then inserted in the holes 29 in the rack, and in corresponding holes in the bar 31, to lock the bar in the rack. Next, the retained bar 37 is latched in place, the toggle clamps are released and finally the ejector is actuated to force the rack from the fingers 25 and the fixture. The loaded rack is then removed for subsequent processing and the compression member 16 is returned to its raised position prior to inserting another empty rack in the fixture.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A metallized paper capacitor racking fixture for compressing spacer separated layers of capacitors in a rack having an open end and means for closing the open end when the rack is loaded, said fixture comprising a main member, bench mounting means for the main member, means on the main member for receiving a rack, clamps for locking a rack in the receiving means, extension members on the main member for the open end of a rack in the fixture, an air cylinder controlled compression member slidably mounted on the main member and control means therefor for pressing the capacitors and spacers into the rack, a cam actuated ejector for forcing loaded racks from the fixture, and a retaining member for ejected racks.

2. A metallized paper capacitor racking fixture for compressing spacer separated layers of capacitors in a rack having an open end and means for closing the open end when loaded, said fixture comprising means for receiving a rack, extension members extending from the open end of the rack for receiving capacitors and spacers therein, means for pressing the capacitors and spacers into the rack, and means for forcing loaded racks from the fixture.

3. A metallized paper capacitor racking fixture for compressing spacer separated layers of capacitors in a rack having an open end and means for closing the open end when loaded, said fixture comprising a main member, means for mounting a rack thereon, extension members on the main member for the open end of a rack on the fixture for receiving capacitors and spacers therein, means for compressing the capacitors and spacers stacked in the rack and extension members into the rack, and a cam actuated ejector for forcing loaded racks from the fixture.

4. A fixture for loading and compressing stacked, resilient cylindrical articles in a rack having an open end and means for closing the open end when loaded, said fixture comprising means for clamping a rack thereon, rack extension members for the open end of a rack clamped thereon for receiving layers of the articles therein, means for compressing layers of articles stacked in the rack and extension members into the rack, and means for ejecting a loaded rack from the fixture.

5. A fixture for loading and compressing spacer separated layers of resilient cylindrical articles in a rack having an open end and means for closing the open end when loaded, said fixture comprising a main vertical member having a front and a back side with vertical slots extending therethrough, a rack receiving portion and a rack extension portion above the receiving portion on the front side for receiving layers of the articles therein, clamps on the main member for holding a rack in the receiving portion, a double acting air cylinder mounted on the back side, a bifurcated compression member connected to the air cylinder and having fingers extending through the slots in the main member, and means for actuating the air cylinder to compress into a rack positioned in the fixture, layers of the articles stacked in the rack and in the extension portion.

6. A fixture for loading and compressing spacer separated layers of resilient cylindrical articles in a rack having an open end and means for closing the open end when loaded, said fixture comprising a main vertical member having a front and a back side with vertical slots extending therethrough, a rack receiving portion and a rack extension portion above the receiving portion on the front side for receiving layers of the articles therein, clamps on the main member for holding a rack in the receiving portion, a double acting air cylinder mounted on the back side, a source of compressed air for the air cylinder, a control valve for selectively applying air from the source to the air cylinder to control the operation of the cylinder, means for controlling the flow of the air through the valve, and a bifurcated compression member, connected to the air cylinder and having fingers extending through the slots in the main member for compressing into a rack positioned in the fixture, layers of the articles stacked in the rack and in the extension portion.

7. A fixture for loading and compressing spacer separated layers of resilient cylindrical articles in a rack having an open end and means for closing the open end when loaded, said fixture comprising a main vertical member having a front and a back side with vertical slots extending therethrough, a rack receiving portion and a rack extension portion above the receiving portion on the front side for receiving layers of the articles therein, clamps on the main member for holding a rack in the receiving portion, a double acting air cylinder mounted on the back side, a bifurcated compression member, connected to the air cylinder, having fingers extending through the slots in the main member, means for actuating the air cylinder to compress into a rack positioned in the fixture layers of the articles stacked in the rack and in the extension portion, and a cam actuated ejector for removing loaded racks from the fixture.

References Cited in the file of this patent

UNITED STATES PATENTS

| | | |
|---|---|---|
| 457,924 | Nuebling | Aug. 18, 1891 |
| 1,818,648 | Purdy | Aug. 11, 1931 |
| 1,894,156 | Byington | Jan. 10, 1933 |
| 2,054,304 | Steinbach | Sept. 15, 1936 |
| 2,579,176 | Dalton | Dec. 18, 1951 |